Figure 1:
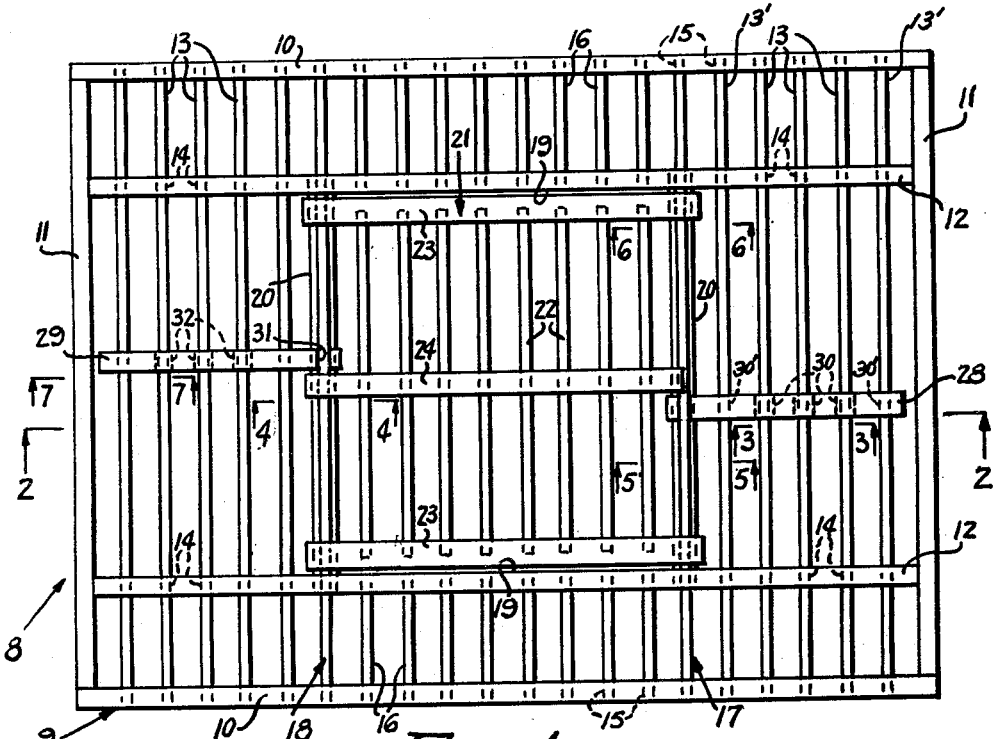

July 21, 1964  O. F. CARPENTER  3,141,566

POULTRY COOP

Filed Jan. 25, 1963

INVENTOR.
OSE F. CARPENTER
BY
Kimmel & Crowell
ATTORNEYS.

United States Patent Office 3,141,566
Patented July 21, 1964

3,141,566
POULTRY COOP
Ose F. Carpenter, Brightwood, Va.
Filed Jan. 25, 1963, Ser. No. 253,878
3 Claims. (Cl. 217—57)

The present invention generally relates to new and useful improvements in poultry coops and crates of the type including a top panel having therein an access opening together with a vertically swingable door therefor, and has for its primary object to provide, in a manner as hereinafter set forth, a coop of this character comprising novel means for releasably locking the door in closed position.

A further object is to provide an improved top panel for a coop or crate and a unique door latching means therefor which may be expeditiously assembled and which is adapted to function without threaded fasteners, springs, etc.

Other objects are to provide a poultry coop which is comparatively simple in construction, strong, durable, compact, of light weight, and which may be manufactured at low cost.

Figure 2:
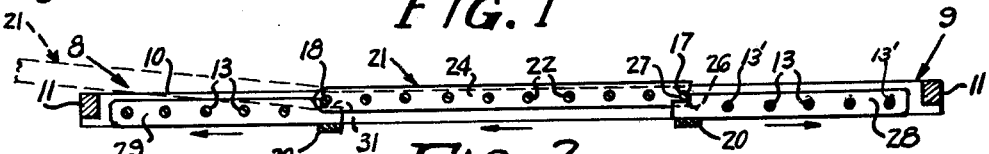
Figures 3, 4, 5:
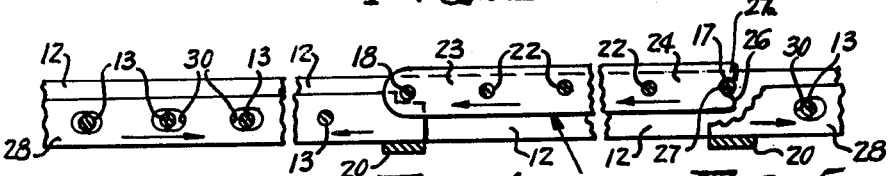
Figures 6, 7:

All of the foregoing and still further objects and advantages of the present invention will be apparent from a study of the following specification, taken in connection with the accompanying drawing, wherein like reference characters designate corresponding parts through the several views, and wherein:

FIGURE 1 is a top plan view of an improved poultry coop top embodying the present invention;

FIGURE 2 is a vertical longitudinal sectional view taken substantially on the line 2—2 of FIGURE 1 and looking in the direction indicated by the arrows; and FIGURES 3, 4, 5, 6, and 7 are fragmentary longitudinal sectional views on an enlarged scale, taken substantially on the lines 3—3, 4—4, 5—5, 6—6, and 7—7, respectively, of FIGURE 1, looking in the direction indicated by the arrows.

Referring now to this drawing in detail, it will be seen that the embodiment of the present invention, which has been illustrated, comprises a substantially rectangular top panel of suitable wood or other material, which is generally designated by the reference numeral 8. The panel 8 includes a frame 9 of suitable dimensions, said frame comprising longitudinal side bars or members 10 with end bars or members 11 extending between the end portions thereof and secured thereto in any suitable manner.

The frame 9 further comprises longitudinal brace bars or members 12 extending between the end members 11 in inwardly spaced parallelism with the side members 10. Spaced, parallel rods or dowels 13 are mounted transversely in the end portions of the frame 9. The dowels 13 pass through openings or bores 14 in the brace bars or members 12 and have their end portions engaged in sockets 15 which are provided therefore in the side members 10. Relatively short dowels or rods 16 extend between the intermediate portions of the members 10 and 12. The members 12 and the innermost dowels 17 and 18 define an access opening 19 in the top panel 8 of the coop the dowel 17 defining a keeper dowel and the dowel 18 defining a hinge dowel. The assembly is stiffened and reinforced by transverse bars or members 20 also partially defining the opening 19, said bars having their end portions secured beneath the members 12.

A door 21 for the opening 19 is mounted for vertical swinging movement on the dowel, pin, or rod 18, said door, when in its closed position, being received between the members 12. The door 21 comprises spaced, parallel sides 23 and a latch bar 24, respectively, having one end portion journalled on the hinge dowel or rod 18. The door 21 further comprises dowels or ribs 22 extending transversely through the member 24 and having their end portions engaged in the members 23. When the door 21 is in a closed position, the free end thereof rests on the keeper dowel or rod 17. Toward this end, the free end portions of the members 23 are undercut or rabbeted, as indicated at 25, to loosely receive and rest on the keeper dowel or rod 17 when the door 21 is closed. Then, the free end of the member 24 includes a cam 26 adapted to engage and snap beneath the dowel or rod 17 and formed to provide a notch or recess 27 for seatingly receiving said dowel or rod, the upper portion of the free end defining a stop means 27a limiting the movement of the latch bar 24 with respect to the keeper dowel 17. Thus, the member 24 functions as a latch bar for securing the door in closed position and the member 17 serves as a keeper.

The panel 8 further includes relatively short front and rear end bars or members 28 and 29, respectively, forwardly and rearwardly of the opening 19. The keeper dowel 17 and the adjacent dowels 13 pass through the front end bar 28. Certain of the openings 30 in the front end bar 28 which receive certain dowels 13 are enlarged or elongated to permit limited relative independent movement of said end bar, thus facilitating bending of the keeper dowel 17 for the passage of the cam 26 and others of the openings 30' receive others of the dowels 13' in relatively close fit relationship. It will be noted that the inner end portions of the bars 28 and 29 traverse the reinforcing bars 20. The inner end portion of the bar 29 projects beneath and supports the pivot dowel or rod 18, having therein a rabbet 31 which accommodates said pivot dowel or rod.

Certain of the openings 32 in the end bar 29 are similar to the corresponding openings 30 in the bar 28 and other openings 32' are similar to the openings 30'. Thus, one setting of the boring machine is saved during manufacture.

It is thought that the operation of the door will be readily apparent from a consideration of the foregoing. Briefly, to lock the door in its closed position, sufficient downward pressure is applied to the free end thereof to engage the cam 26 with a snap action beneath the resilient keeper rod 17 which is received in the pocket, notch or recess 27. By mounting the end bar 28 on a plurality of dowels, as shown, warping is prevented and difficulty from consequent bending or displacement of the keeper 17 is avoided. In this connection, it will be appreciated that it is highly unlikely that the several dowels will warp in the same direction. Rather, they will probably warp in different directions and thus stabilize each other. Of course, to open the door 21, the foregoing procedure is substantially reversed. It will be noted that the hinge or pivot dowel 18 is vertically offset relatively to the other dowels whereby the door 21, when open, is permitted to rest substantially flat on the panel 8 to be firmly supported thereby, thus preventing said door from being broken or damaged.

It is to be understood that the number of enlarged or elongated holes 30 in the front end bar 28 will vary depending on the size of the coop and the type of rods used. If the rods are made of more flexible wood it is not necessary to use as many enlarged or elongated holes as when the rods are made of very stiff wood, such as hickory. Also, if the rods were of smaller size then fewer of the elongated holes would be used and if the rods were of larger diameter it would then be necessary to increase the number of elongated holes.

It is believed that the many advantages of a poultry coop constructed in accordance with the present invention will be readily understood and although a preferred embodiment of the device is as illustrated and described, it is to be understood that changes in the details of construction and in the combination and arrangement of parts may be resorted to, which will fall within the scope of said invention as claimed. For example, the member 24 may be mounted off-center on the door 21 to permit the end bars 28 and 29 to be longitudinally aligned and centered in the frame 9, if desired.

I claim:

1. In a top panel for a poultry coop, elements defining an access opening, a plurality of spaced, parallel, resilient dowels on at least one side of said elements defining said access opening, a door for the access opening, means hingedly mounting said door on the side of said access opening opposing said dowels, a connecting bar having a plurality of spaced openings defined therein receiving said dowels therethrough, certain of the last-mentioned openings loosely receiving certain of said dowels for permitting limited movement of said connecting bar independently of said certain dowels, and others of said last-mentioned openings receiving others of said dowels in relatively close fit relationship, a resilient keeper dowel spaced toward said access opening from said dowels and parallel to said dowels, said keeper dowel being in abutting engagement with an end portion of said connecting bar, and a latch bar secured to said door, end portions of said latch bar being engageable with said keeper dowel for releasably locking said door in a closed position, said end portions of said latch bar pushing said keeper dowel against the end portion of said connecting bar during closing of said door.

2. The structure of claim 1 wherein said end portions of said latch bar define a notch for seatingly receiving said keeper dowel, a cam means below said notch for snapping over said keeper dowel, and a stop means above said notch for limiting the movement of said latch bar with respect to said keeper dowel.

3. The structure of claim 2 wherein said door includes a pair of side bars hingedly mounted on the side of said access opening opposing said dowels, said side bars having free ends with portions defining rabbet means loosely resting on said keeper dowel when said door is in said closed position, said latch bar being substantially centrally disposed with respect to said side bars and being hingedly mounted on the side of said access opening opposing said dowels, and a plurality of spaced additional dowels extending transversely through said latch bar and having oppositely disposed end portions secured in said side bars.

References Cited in the file of this patent
UNITED STATES PATENTS

| | | |
|---|---|---|
| 2,863,691 | Carpenter | Dec. 9, 1958 |
| 3,095,992 | Schreckhise | July 2, 1963 |